US009778539B2

(12) United States Patent
Miyazaki et al.

(10) Patent No.: US 9,778,539 B2
(45) Date of Patent: Oct. 3, 2017

(54) OPTICAL MODULATION DEVICE

(71) Applicant: SUMITOMO OSAKA CEMENT CO., LTD., Tokyo (JP)

(72) Inventors: Norikazu Miyazaki, Tokyo (JP); Toshio Kataoka, Tokyo (JP); Youichi Hosokawa, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/780,657

(22) PCT Filed: Feb. 25, 2014

(86) PCT No.: PCT/JP2014/054527
§ 371 (c)(1),
(2) Date: Sep. 28, 2015

(87) PCT Pub. No.: WO2014/156435
PCT Pub. Date: Oct. 2, 2014

(65) Prior Publication Data
US 2016/0054638 A1    Feb. 25, 2016

(30) Foreign Application Priority Data

Mar. 29, 2013  (JP) ................. 2013-075400

(51) Int. Cl.
*G02F 1/225*  (2006.01)
*G02F 1/01*  (2006.01)
*G02F 1/21*  (2006.01)

(52) U.S. Cl.
CPC .......... *G02F 1/2255* (2013.01); *G02F 1/0123* (2013.01); *G02F 2001/212* (2013.01)

(58) Field of Classification Search
CPC ...... G02F 1/225; G02F 1/2255; G02F 1/0123; G02F 2001/212
(Continued)

(56) References Cited

U.S. PATENT DOCUMENTS

| 2003/0067360 A1* | 4/2003 | Takada ............... H03B 5/326 331/107 SL |
| 2003/0227666 A1* | 12/2003 | Bridges .............. G02F 1/2255 359/321 |
| 2010/0202723 A1* | 8/2010 | Sugiyama ............ G02F 1/0316 385/2 |

FOREIGN PATENT DOCUMENTS

| JP | H03269402 A | 12/1991 |
| JP | 2010185979 A | 8/2010 |

(Continued)

OTHER PUBLICATIONS

International Search Report of PCT/JP2014/054527 mailed May 27, 2014.

*Primary Examiner* — Ryan Lepisto
(74) *Attorney, Agent, or Firm* — Taft Stettinius & Hollister LLP

(57) ABSTRACT

Provided is an optical waveguide element including a first interactive part, a first EO substrate line, a second interactive part, and a second EO substrate line. A relay substrate unit includes a first relay substrate line, a second relay substrate line, and a loss adjusting part. The loss adjusting part is provided to the relay substrate line in a combination in which an electrical loss is low so that an electrical loss in a combination of the first EO substrate line and the first relay substrate line, and an electrical loss in a combination of the second EO substrate line and the second relay substrate line become approximately the same as each other.

2 Claims, 9 Drawing Sheets

(58) Field of Classification Search
USPC .......................................................... 385/1–3
See application file for complete search history.

(56) References Cited

FOREIGN PATENT DOCUMENTS

| | | |
|---|---|---|
| JP | 2014149394 A | 8/2014 |
| WO | WO2014119744 A1 | 8/2014 |

* cited by examiner

OPTICAL MODULATION DEVICE

TECHNICAL FIELD

The present invention relates to an optical modulation device.

BACKGROUND ART

The optical modulation device includes plural interactive parts which interact with a light-wave and modulate the light-wave so as to support multi-level modulation or polarization multiplexing modulation. An electrical signal for modulation of the light-wave is supplied to each of the interactive parts through electrical line that is provided to each of the interactive parts. As described above, in the case where the optical modulation device includes the plural interactive parts, it is demanded to make electrical lengths of the electrical lines, which extend to the interactive parts, even, and to keep the same electrical loss between the electrical lines provided to the respective interactive parts so as to make electrical signal states input to the respective interactive parts coincide with each other.

For example, an optical modulation device described in Patent Literature No. 1 includes an optical waveguide element having plural interactive parts (modulation units) and plural electrical lines configured to supply an electrical signal to the respective interactive parts. In addition, propagation loss is reduced by increasing the thickness of a line which has a high loss, among the electrical lines, thereby keeping the same loss between the respective electrical lines.

PRIOR ART

Citation List

Patent Literature

[Patent Literature No. 1] Japanese Laid-open Patent Publication No. 2010-185979

SUMMARY OF INVENTION

Problems to be Resolved by the Invention

It is necessary to change a cross section structure of an electrode so as to adjust the loss in the electrode. In a case where electrical lines are constructed on the same substrate, in an electrode configuration with a low loss, it is necessary to make a signal electrode width wider or it is necessary to make a gap between a signal electrode and a ground electrode be further expanded in comparison to other electrode structures. Therefore, the size of the electrode structure itself is apt to increase. In this case, cross-talk between the electrical lines tends to occurs, and thus it is necessary to make the size of the substrate larger by increasing the gap between the electrical line so as to suppress the deterioration of characteristics.

In a case where the integration of a modulation unit has progressed, one modulator has plural modulation units, and the length thereof is different in each case, various kinds of electrical line structures are necessary for a line portion, and thus with respect to the above-described cross-talk between electrodes, bending loss, and the like, it is necessary to consider a countermeasure corresponding to each of the structures. Accordingly, design becomes very complicated.

Here, in the optical modulation device, there is demand for additional down-sizing of the optical waveguide element provided with the interactive parts. Accordingly, it is difficult to embed the structure reducing the propagation loss in the electrical lines, which have a high loss, to the optical waveguide element in a manner similar to the optical modulation device disclosed in Patent Literature No. 1. However, when this structure is not embedded, it is difficult to keep the same loss between the respective electrical lines.

Accordingly, an object of an aspect of the invention is to provide an optical modulation device capable of keeping the same electrical length and the same electrical loss between plural electrical lines which extend to plural interactive parts and supply an electrical signal to the plural interactive parts, respectively, while down-sizing an optical waveguide element.

Means of Solving the Problems

According to an aspect of the invention, there is provided an optical modulation device including an optical waveguide element that is provided to a substrate having an electro-optical effect, and a relay substrate unit that inputs an electrical signal to the optical waveguide element. The optical waveguide element includes a first optical waveguide to which a light-wave is input, a first interactive part which is provided along the first optical waveguide, and interacts with the light-wave that is guided through the first optical waveguide, a first EO substrate line that inputs the electrical signal to the first interactive part, a second optical waveguide to which the light-wave is input, a second interactive part which is provided along the second optical waveguide, and interacts with the light-wave that is guided through the second optical waveguide, and a second EO substrate line that inputs the electrical signal to the second interactive part. The relay substrate unit includes a first relay substrate line which is connected to the first EO substrate line, and transmits the electrical signal to the first EO substrate line, a second relay substrate line which is connected to the second EO substrate line, and transmits the electrical signal to the second EO substrate line, and a loss adjusting part that increases an electrical loss. An electrical length of the first EO substrate line and an electrical length of the second EO substrate line are different from each other. A total electrical length in a combination of the first EO substrate line and the first relay substrate line, and a total electrical length in a combination of the second EO substrate line and the second relay substrate line are approximately the same as each other. The loss adjusting part is provided to at least the first relay substrate line or the second relay substrate line in a combination in which the electrical loss is low so that a total electrical loss in the combination of the first EO substrate line and the first relay substrate line, and a total electrical loss in the combination of the second EO substrate line and the second relay substrate line become approximately the same as each other.

According to the optical modulation device, the loss adjusting part, which is provided to the relay substrate line, increases the electrical loss of at least the first relay substrate line or the second relay substrate line in a combination in which the electrical loss is low so that the total electrical loss in the combination of the first EO substrate line and the first relay substrate line, and a total electrical loss in the combination of the second EO substrate line and the second relay substrate line become approximately the same as each other. As described above, since the loss adjusting part configured to increase the electrical loss is provided to the relay substrate unit, it is possible to realize down-sizing of the optical waveguide element while keeping the same electrical loss between plural lines which supply an electrical signal to plural interactive parts, respectively.

The loss adjusting part may be constituted by an electrical line of which a loss is different from a loss of the first EO substrate line, the second EO substrate line, the first relay substrate line, and the second relay substrate line. In this case, it is possible to easily increase the electrical loss by the electrical line in which the loss is different from that of the first EO substrate line, the second EO substrate line, the first relay substrate line, and the second relay substrate line.

The loss adjusting part may be constituted by a lumped parameter circuit or a distributed constant circuit. As described above, when the concentrated constant circuit or the distributed constant circuit is used, it is possible to more suitably increase the electrical loss.

A Mach-Zehnder type optical waveguide structure may be constituted by the first optical waveguide, the second optical waveguide, the first interactive part, and the second interactive part. As described above, even in the optical modulation device having the Mach-Zehnder type optical waveguide structure, it is possible to realize down-sizing of the optical waveguide element while keeping the same electrical loss between plural lines which supply an electrical signal to plural interactive parts, respectively.

Advantageous Effects of Invention

According to the aspect of the invention, it is possible to keep the same electrical loss between plural lines which supply an electrical signal to plural interactive parts, respectively, while realizing down-sizing of the optical waveguide element.

In addition, the loss adjusting part is provided to only a part of the line, and thus a common design rule can be applied to other line portions, and thus design of an electrode and a relay substrate of a modulator becomes easy.

In addition, it is easy to select an electrode structure, which is advantageous for the down-sizing of lines, for an electrode (electrical line) other than the loss adjusting part, and this has an effect on the down-sizing of a device.

DESCRIPTION OF EMBODIMENTS

Hereinafter, an embodiment of the invention will be described in detail with reference to the accompanying drawing.

Figure 1:
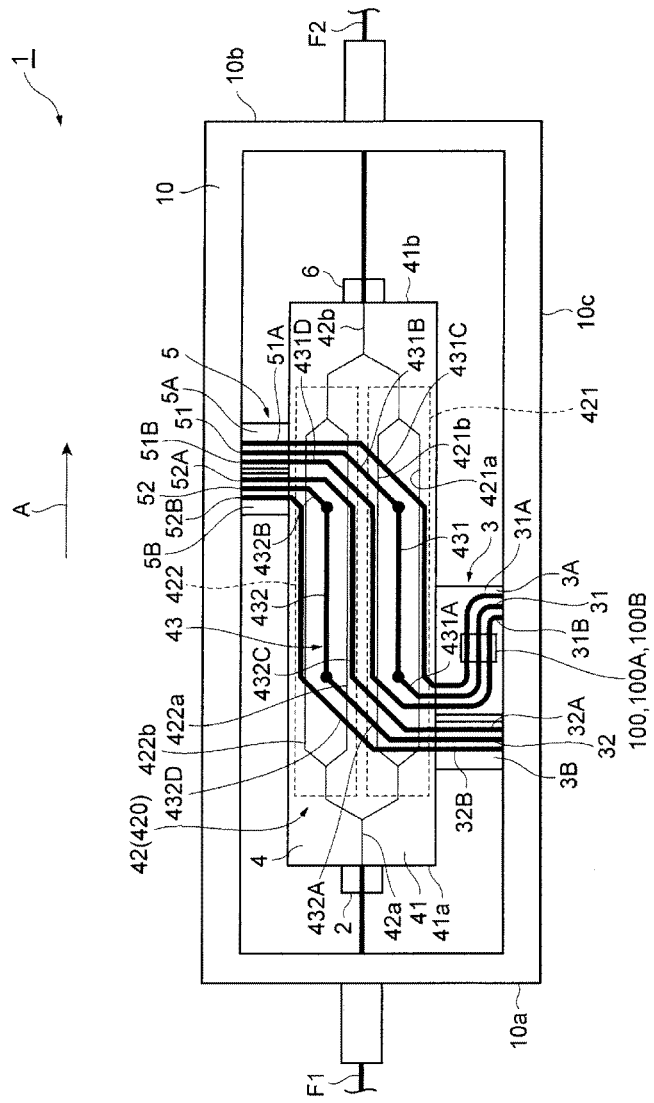
FIG. 1 is a view schematically illustrating a configuration of an optical modulation device according to an embodiment, a first modification example, and a second modification example.

As illustrated in FIG. 1, an optical modulation device 1 is an optical device that modulates a light-wave input by an optical fiber F1 and outputs modulated light to an optical fiber F2. The optical modulation device 1 includes an optical input port 2, a relay substrate unit 3, an optical waveguide element 4, a terminator substrate unit 5, an optical output port 6, and a case body 10.

The case body 10 is a box-shaped component that extends in one direction (hereinafter, referred to as a "direction A"), and is made of, for example, stainless steel. The case body 10 has one end surface 10a and the other end surface 10b which are both end surfaces in the direction A. A hole, into which the optical fiber F1 is inserted, is provided in the one end surface 10a. A hole, into which the optical fiber F2 is inserted, is provided in the other end surface 10b. For example, the optical input port 2, the relay substrate unit 3, the optical waveguide element 4, the terminator substrate unit 5, and the optical output port 6 are accommodated in the case body 10.

The optical input port 2 supplies the light-wave input by the optical fiber F1 to the optical waveguide element 4. The optical input port 2 may be provided with a sub-part that supports bonding between the optical fiber F1 and the optical waveguide element 4.

The optical waveguide element 4 converts the light-wave input from the optical input port 2 into modulated light in accordance with an electrical signal (modulation signal) output from the relay substrate unit 3, and combines a light-wave by a micro-optics. The optical waveguide element 4 includes an optical waveguide substrate 41, plural optical waveguides 42, and an interactive part 43. For example, the optical waveguide substrate 41 is made of a material such as lithium niobate ($LiNbO_3$, hereinafter, referred to as an "LN") having an electro-optical effect. The optical waveguide substrate 41 extends along the direction A and has one end 41a and the other end 41b which are both ends in the direction A.

The optical waveguides 42 are provided on the optical waveguide substrate 41. For example, each of the optical waveguides 42 is a Mach-Zehnder type optical waveguide, and has a structure that supports a modulation type of the optical waveguide element 4. In this example, a configuration of a nested modulator, which is used in differential quadrature phase shift keying (DQPSK) modulation and the like, is used. In this case, the optical waveguide 42 has a structure in which a first Mach-Zehnder part 421 and a second Mach-Zehnder part 422 are provided on two branched waveguides of a Mach-Zehnder part 420.

An input waveguide 42*a* of the Mach-Zehnder part 420 extends from the one end 41*a* of the optical waveguide substrate 41 along the direction A, and is branched and connected to an input end of the first Mach-Zehnder part 421 and an input end of the second Mach-Zehnder part 422, respectively. At an output waveguide 42*b* of the Mach-Zehnder part 420, waveguides, which extend from an output end of the first Mach-Zehnder part 421 and an output end of the second Mach-Zehnder part 422, are joined to each other, and extend to the other end 41*b* along the direction A.

The first Mach-Zehnder part 421 includes optical waveguides (first optical waveguides) 421*a* and 421*b* which extend along the direction A, and the second Mach-Zehnder part 422 includes optical waveguides (second optical waveguides) 422*a* and 422*b* which extend along the direction A.

The interactive part 43 includes a first interactive part 431 and a second interactive part 432. The first interactive part 431 extends along the optical waveguides 421*a* and 421*b* which are provided on the first Mach-Zehnder part 421, and interacts with a light-wave that is guided along the optical waveguides 421*a* and 421*b*.

The first interactive part 431 is provided on the optical waveguide substrate 41, and applies an electrical field corresponding to an electrical signal to the optical waveguides 421*a* and 421*b*. Modulation action is given to the light, which propagates through the optical waveguides 421*a* and 421*b*, due to the electrical field. The first interactive part 431 is made of mainly gold (Au) and the like. In addition, the optical waveguide substrate 41 includes a first EO substrate line 431A that inputs an electrical signal transmitted from the relay substrate unit 3 to the first interactive part 431, and a first output line part 431B that outputs the electrical signal transmitted from the first interactive part 431 to the terminator substrate unit 5.

In addition, a first ground electrode part 431C that sandwiches the optical waveguide 421*a* with the first interactive part 431, and a first ground electrode part 431D that sandwiches the optical waveguide 421*b* with the first interactive part 431 are provided on the optical waveguide substrate 41. One end of the first ground electrode part 431C is connected to a first ground electrode part 31A that is provided to a first relay substrate 3A of the relay substrate unit 3, and the other end of the first ground electrode part 431C is connected to a first ground electrode part 51A that is provided to a first terminator substrate 5A of the terminator substrate unit 5. Similarly, one end of the first ground electrode part 431D is connected to a first ground electrode part 31B that is provided to the first relay substrate 3A of the relay substrate unit 3, and the other end of the first ground electrode part 431D is connected to a first ground electrode part 51B that is provided to the first terminator substrate 5A of the terminator substrate unit 5.

The second interactive part 432 extends along the optical waveguides 422*a* and 422*b* which are provided to the second Mach-Zehnder part 422, and interacts with a light-wave that is guided through the optical waveguides 422*a* and 422*b*.

The second interactive part 432 is provided on the optical waveguide substrate 41, and applies an electrical field corresponding to an electrical signal to the optical waveguides 422*a* and 422*b*. Modulation action is given to the light, which propagates through the optical waveguides 422*a* and 422*b*, due to the electrical field. The second interactive part 432 is made of mainly gold (Au) and the like. In addition, the optical waveguide substrate 41 includes a second EO substrate line 432A that inputs an electrical signal transmitted from the relay substrate unit 3 to the second interactive part 432, and a second output line part 432B that outputs the electrical signal transmitted from the second interactive part 432 to the terminator substrate unit 5.

In addition, a second ground electrode part 432C that sandwiches the optical waveguide 422*a* with the second interactive part 432, and a second ground electrode part 432D that sandwiches the optical waveguide 422*b* with the second interactive part 432 are provided on the optical waveguide substrate 41. One end of the second ground electrode part 432C is connected to a second ground electrode part 32A that is provided to a second relay substrate 3B of the relay substrate unit 3, and the other end of the second ground electrode part 432C is connected to a second ground electrode part 52A that is provided to a second terminator substrate 5B of the terminator substrate unit 5. Similarly, one end of the second ground electrode part 432D is connected to a second ground electrode part 32B that is provided to the second relay substrate 3B of the relay substrate unit 3, and the other end of the second ground electrode part 432D is connected to a second ground electrode part 52B that is provided to the second terminator substrate 5B of the terminator substrate unit 5.

As described above, the first Mach-Zehnder part 421 and the second Mach-Zehnder part 422 constitute a QPSK modulator using a so-called X-cut substrate.

The light-wave that is input to the optical waveguide element 4 from the optical input port 2 is input to the first Mach-Zehnder part 421 and the second Mach-Zehnder part 422 in a branched manner by the input waveguide 42*a*. When propagating through the first Mach-Zehnder part 421 and the second Mach-Zehnder part 422, the branched light-waves are modulated by an electrical signal supplied to the interactive part 43, respectively. A phase difference of 90° is made to the modulated light that is modulated at the first Mach-Zehnder part 421, and the modulated light that is modulated at the second Mach-Zehnder part 422 by means for causing a phase difference (not illustrated). The resultant modulated light that is combined at the output waveguide 42*b* is output from the optical waveguide element 4.

The relay substrate unit 3 relays an electrical signal (typically, 5 V to 8 V) that is supplied from an outer side, and outputs the electrical signal to the optical waveguide element 4. For example, the electrical signal is input to the relay substrate unit 3 through a connector for electrical signal input which is provided on a side surface 10*c* of the case body 10. More specifically, the relay substrate unit 3 includes the first relay substrate 3A and the second relay substrate 3B.

The first relay substrate 3A includes a first relay substrate line 31, the first ground electrode part 31A, the first ground electrode part 31B, and a loss adjusting part 100. The first relay substrate line 31 is connected to the first EO substrate line 431A that is provided to the optical waveguide substrate 41, and transmits the electrical signal to the first EO substrate line 431A. The first ground electrode parts 31A and 31B are connected to the first ground electrode parts 431C and 431D which are provided to the optical waveguide substrate 41, respectively.

The loss adjusting part 100 increases an electrical loss of the electrical signal that is transmitted by the first relay substrate line 31. Details of the loss adjusting part 100 will be described later.

The second relay substrate 3B includes a second relay substrate line 32, the second ground electrode part 32A, and the second ground electrode part 32B. The second relay substrate line 32 is connected to the second EO substrate line 432A that is provided to the optical waveguide substrate 41, and transmits the electrical signal to the second EO substrate line 432A. The second ground electrode parts 32A and 32B are connected to the second ground electrode parts 432C and 432D which are provided to the optical waveguide substrate 41, respectively.

The terminator substrate unit 5 is an electrical terminator of the electrical signal that is input to the optical waveguide element 4. The terminator substrate unit 5 includes the first terminator substrate 5A and the second terminator substrate 5B. The first terminator substrate 5A includes the first ground electrode part 51A, the first ground electrode part 51B, and a first terminator substrate line 51. The first ground electrode parts 51A and 51B are connected to the first ground electrode parts 431C and 431D which are provided to the optical waveguide substrate 41, respectively. The first terminator substrate line 51 is connected to the first output line part 431B, and outputs an electrical signal transmitted from the first output line part 431B.

The second terminator substrate 5B includes the second ground electrode part 52A, the second ground electrode part 52B, and a second terminator substrate line 52. The second ground electrode parts 52A and 52B are connected to the second ground electrode parts 432C and 432D which are provided to the optical waveguide substrate 41, respectively. The second terminator substrate line 52 is connected to the second output line part 432B and outputs an electrical signal transmitted from the second output line part 432B.

Here, the first EO substrate line 431A and the second EO substrate line 432A have electrical lengths different from each other. In this embodiment, the electrical length of the first EO substrate line 431A is shorter than that of the second EO substrate line 432A. In addition, the total electrical length in a combination of the first EO substrate line 431A and the first relay substrate line 31 is substantially the same as the total electrical length in a combination of the second EO substrate line 432A and the second relay substrate line 32.

The optical output port 6 outputs the modulated light, which is output from the optical waveguide element 4, to the optical fiber F2. The optical output port 6 is provided at the other end 41b of the optical waveguide substrate 41.

Next, details of the loss adjusting part 100 will be described. The loss adjusting part 100 is provided to the first relay substrate line 31 or the second relay substrate line 32 in a combination, in which an electrical loss is low, between the combination of the first EO substrate line 431A and the first relay substrate line 31, and the combination of the second EO substrate line 432A and the second relay substrate line 32. In this embodiment, the total electrical loss in the combination of the first EO substrate line 431A and the first relay substrate line 31 is smaller than the total electrical loss in the combination of the second EO substrate line 432A and the second relay substrate line 32. Accordingly, the loss adjusting part 100 is provided to the first relay substrate line 31.

The loss adjusting part 100 increases the electrical loss of the first relay substrate line 31 so that the total electrical loss in the combination of the first EO substrate line 431A and the first relay substrate line 31, and the total electrical loss in the combination of the second EO substrate line 432A and the second relay substrate line 32 become the same as each other.

Figure 2:
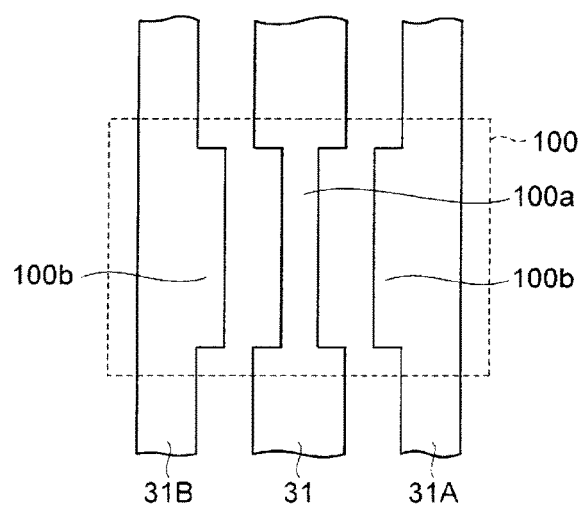
FIG. 2 is a view illustrating a configuration of a loss adjusting part in FIG. 1.

A configuration of the loss adjusting part 100 is illustrated in FIG. 2. As illustrated in FIG. 2, the loss adjusting part 100 can be constituted by a draw-in part 100a in which the width of a part of the electrical line of the first relay substrate line 31 is narrowed (a cross-sectional area is made to be reduced), and a wide width part 100b in which the width of portions of the first ground electrode parts 31A and 31B which are adjacent to the draw-in part 100a is broadened (a cross-sectional area is made to increase).

When the draw-in part 100a is provided, the electrical loss of the first relay substrate line 31 increases. In addition, the shape of the draw-in part 100a and the wide width part 100b is set so that the total electrical loss in the combination of the first EO substrate line 431A and the first relay substrate line 31 becomes the same as the total electrical loss in the combination of the second EO substrate line 432A and the second relay substrate line 32.

In this embodiment, the loss adjusting part 100, which is constructed as described above and which increases the electrical loss so that the total electrical loss in the combination of the first EO substrate line 431A and the first relay substrate line 31 becomes the same as the total electrical loss in the combination of the second EO substrate line 432A and the second relay substrate line 32, is provided to the relay substrate unit 3. According to this, it is possible to realize down-sizing of the optical waveguide element 4 while keeping the same electrical loss between the lines which supply an electrical signal to the first interactive part 431 and the second interactive part 432, respectively.

The loss adjusting part 100 is constructed by narrowing the width of the electrical line of the first relay substrate line 31 and the like. That is, when the loss adjusting part 100 is constituted by using wire dimensions different from those of the first relay substrate line 31, it is possible to easily increase the electrical loss.

In addition, the relay substrate unit 3 is constituted by the first relay substrate 3A and the second relay substrate 3B, and the first relay substrate line 31 and the second relay substrate line 32 are provided to the substrates, respectively. According to this, it is possible to suppress cross-talk between the first relay substrate line 31 and the second relay substrate line 32. However, it is not indispensable to constitute the relay substrate unit 3 by the first relay substrate 3A and the second relay substrate 3B, and the relay substrate unit 3 may be constituted by one substrate. Similarly, the terminator substrate unit 5 is constituted by the first terminator substrate 5A and the second terminator substrate 5B, and the first terminator substrate line 51 and the second terminator substrate line 52 are provided to the substrates, respectively. According to this, it is possible to suppress cross-talk between the first terminator substrate line 51 and the second terminator substrate line 52. However, it is not indispensable to constitute the terminator substrate unit 5 by the first terminator substrate 5A and the second terminator substrate 5B, and the terminator substrate unit 5 may be constituted by one substrate.

First Modification Example

Figure 3:
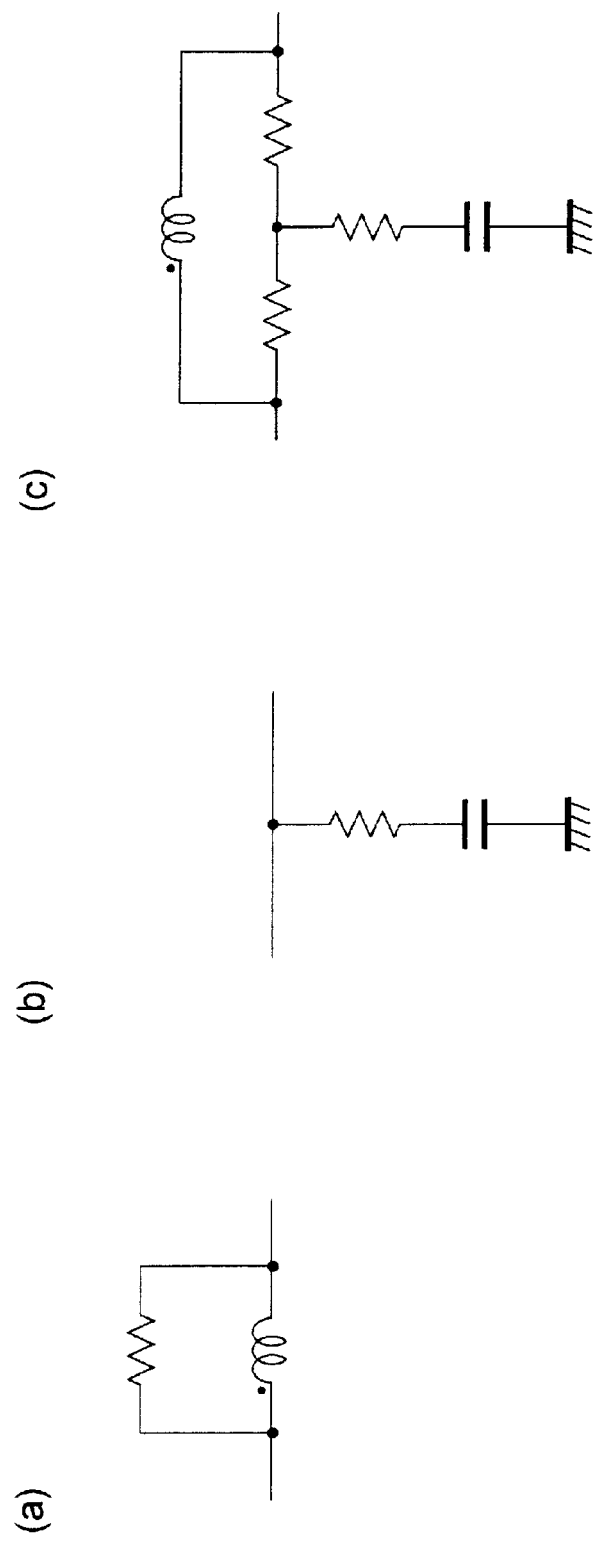
FIG. 3 is a view illustrating a circuit configuration of a loss adjusting part in the first modification example, and in FIG. 3, (a) illustrates a circuit that is constituted by a inductor and a resistor, (b) illustrates a circuit that is constituted by a resistor and a capacitor, and (c) illustrates a circuit that is constituted by a inductor, a resistor, and a capacitor.

Next, a first modification example of the loss adjusting part will be described. In the first modification example, a lumped parameter circuit is used as a loss adjusting part 100A (refer to FIG. 1). In addition, a circuit, in which as a frequency becomes higher, the loss increases, is used as the loss adjusting part 100A. More specifically, the loss adjusting part 100A may be constructed as a circuit that is constituted by a inductor and a resistor as illustrated in (a) of FIG. 3, a circuit that is constituted by a resistor and a capacitor as illustrated in (b) of FIG. 3, a circuit that is constituted by a inductor, a resistor, and a capacitor as illustrated in (c) of FIG. 3, or a combination of these circuits.

Figure 4:
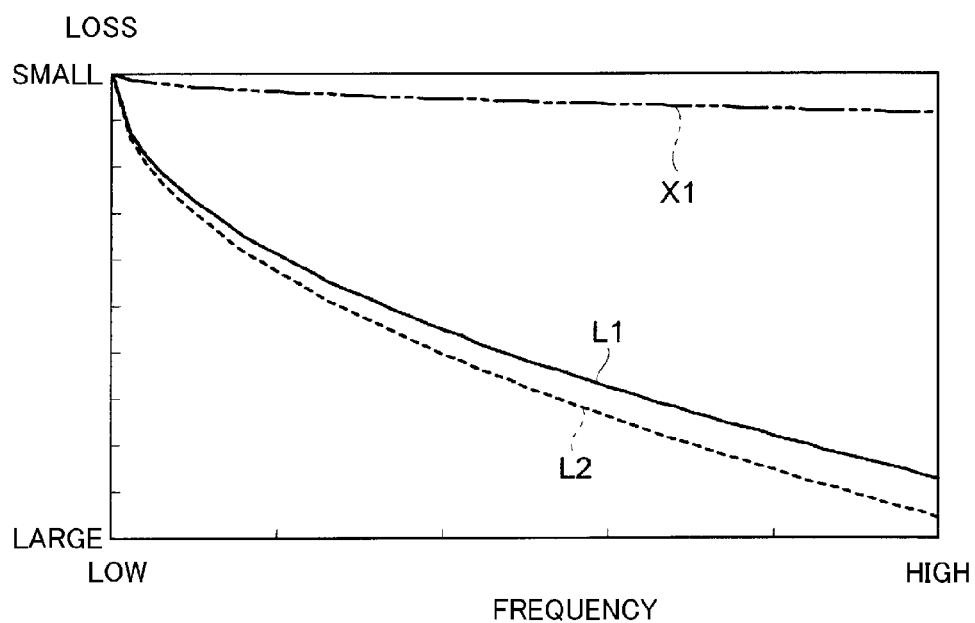
FIG. 4 is a view illustrating electrical loss characteristics of an electrical line 1, an electrical line 2, and a loss adjusting part in the first modification example.

Here, FIG. 4 illustrates total electrical loss characteristics L1 in the combination (hereinafter, referred to as an "electrical line 1") of the first EO substrate line 431A and the first relay substrate line 31, and total electrical loss characteristics L2 in the combination (hereinafter, referred to as an "electrical line 2") of the second EO substrate line 432A and the second relay substrate line 32. As the frequency becomes higher, the electrical loss in the electrical line 1 and the electrical line 2 increases. In this modification example, a circuit configuration of the loss adjusting part 100A is selected so that the total electrical loss of the electrical loss (characteristics L1) in the electrical line 1, and the electrical loss (characteristics X1 in FIG. 4) in the loss adjusting part 100A becomes the electrical loss (characteristics L2) in the electrical line 2. As described above, when the loss adjusting part 100A is constituted by the lumped parameter circuit using at least one of the inductor, the resistor, and the capacitor, it is possible to more suitably increase the electrical loss.

Second Modification Example

Figure 5:
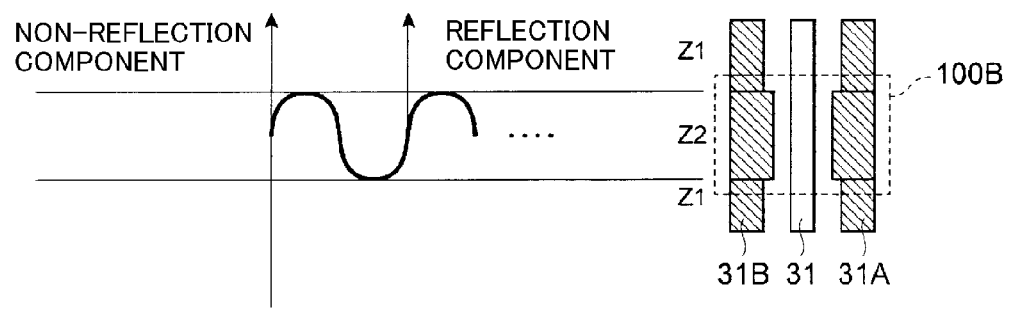
FIG. 5 is a view illustrating a schematic configuration of a loss adjusting part in the second modification example.

Next, a second modification example of the loss adjusting part will be described. In the second modification example, a distributed constant circuit is used as a loss adjusting part 100B (refer to FIG. 1). More specifically, as the loss adjusting part 100B, as illustrated in FIG. 5, a region having impedance different from that of other regions is formed at a part of the first relay substrate line 31, and the first ground electrode parts 31A and 31B (any configuration is possible as long as impedance Z1 and impedance Z2 are different from each other, and Z2 may be greater or smaller than Z1).

The loss adjusting part 100B using the distributed constant circuit adjusts the electrical loss by using reflection that occurs due to a difference in impedance. In the loss adjusting part 100B, reflection with the same magnitude relation of impedance occurs twice, and thus a phase variation due to reflection satisfies an in-phase relationship between a non-reflection component and a reflection component. Accordingly, it is possible to construct the loss adjusting part 100B in which transmission of DC is the maximum, and transmission characteristics vary in accordance with a frequency and the length of the adjusting part. Here, the transmission characteristics are characteristics obtained from a combination between the non-reflection component and the reflection component.

Figure 6:
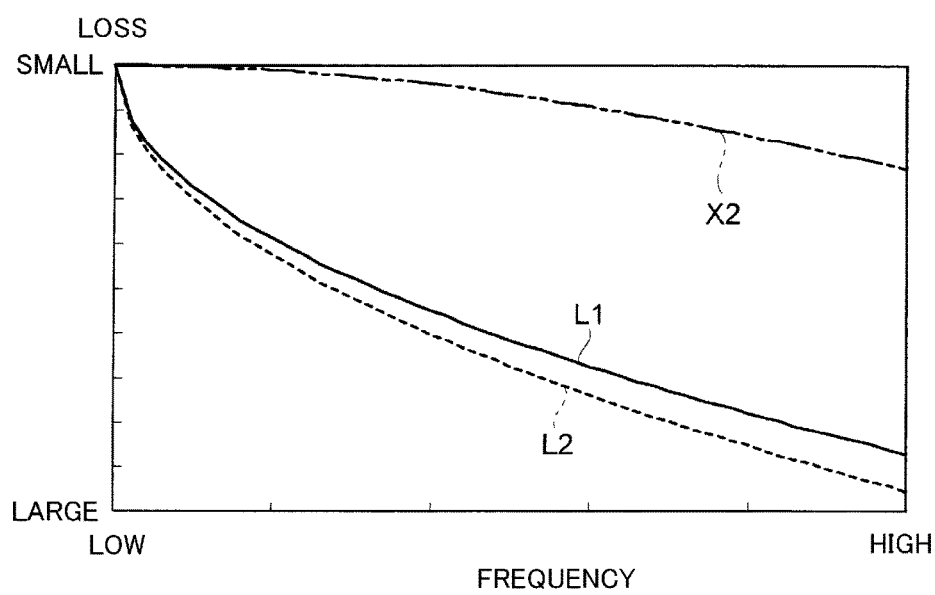
FIG. 6 is a view illustrating electrical loss characteristics of an electrical line 1, an electrical line 2, and the loss adjusting part in the second modification example.

Here, FIG. 6 illustrates total electrical loss characteristics L1 in the combination (electrical line 1) of the first EO substrate line 431A and the first relay substrate line 31, total electrical loss characteristics L2 in the combination (electrical line 2) of the second EO substrate line 432A and the second relay substrate line 32, and electrical loss characteristics X2 of the loss adjusting part 100B. In this modification example, the loss adjusting part 100B is formed so that the total electrical loss of the electrical loss (characteristics L1) in the electrical line 1, and the electrical loss (characteristics X2 in FIG. 6) in the loss adjusting part 100B becomes the same as the electrical loss (characteristics L2) in the electrical line 2. In addition, the loss adjusting part 100B can adjust the slope of the electrical loss with respect to a frequency by changing the impedance of the electrical line of the adjusting part, and the length of the adjusting part. As described above, when the loss adjusting part 100B is constituted by the distributed constant circuit, it is possible to more suitably increase the electrical loss.

Third Modification Example

Figure 7:
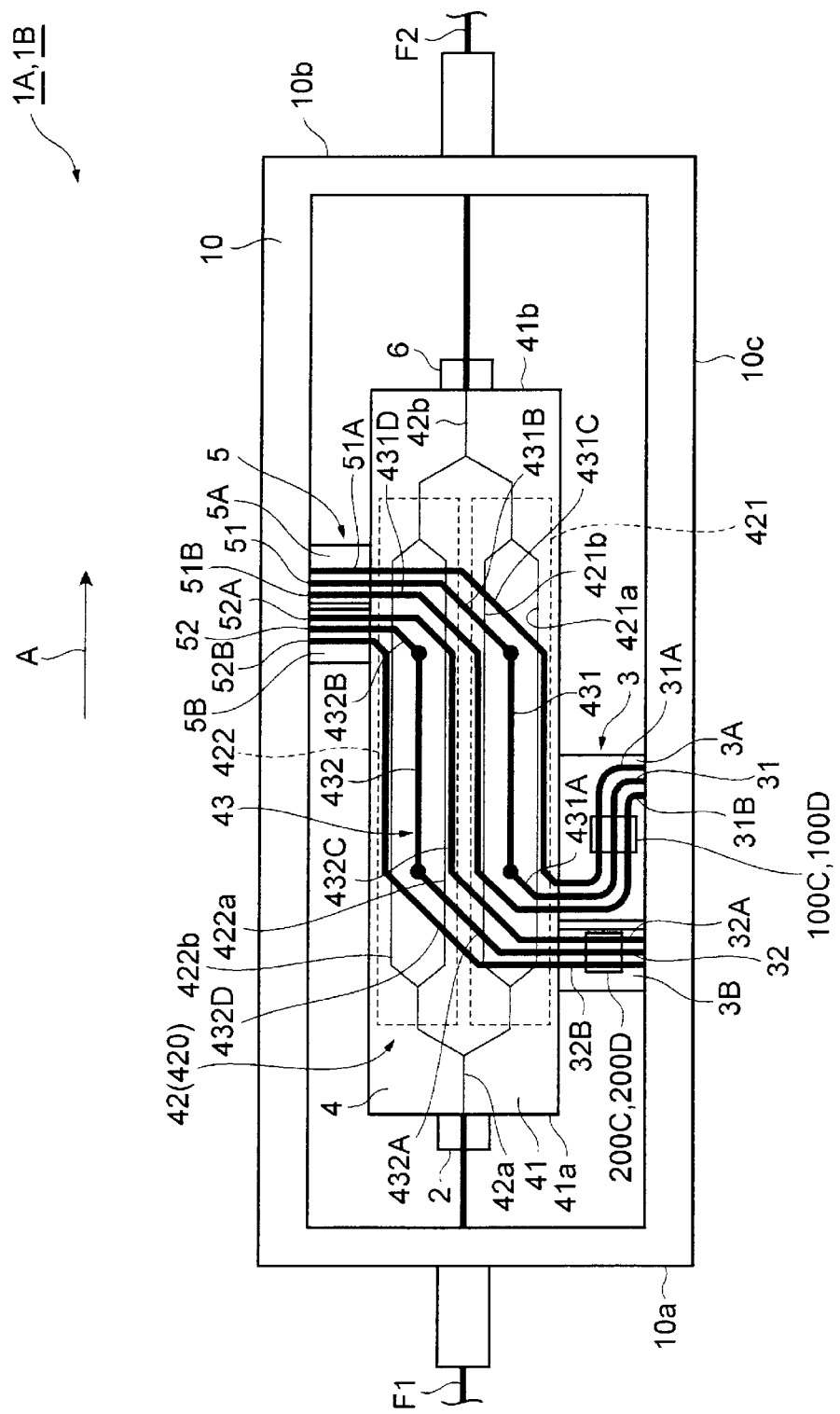
FIG. 7 is a view schematically illustrating a configuration of an optical modulation device according to third and fourth modification examples.

Next, a third modification example of the loss adjusting part will be described. In the third modification example, as illustrated in FIG. 7, a loss adjusting part 100C is provided to the first relay substrate line 31 of an optical modulation device 1A, and a loss adjusting part 200C is provided to the second relay substrate line 32 of the optical modulation device 1A. All of the loss adjusting parts 100C and 200C are configured to increase an electrical loss.

Figure 8:
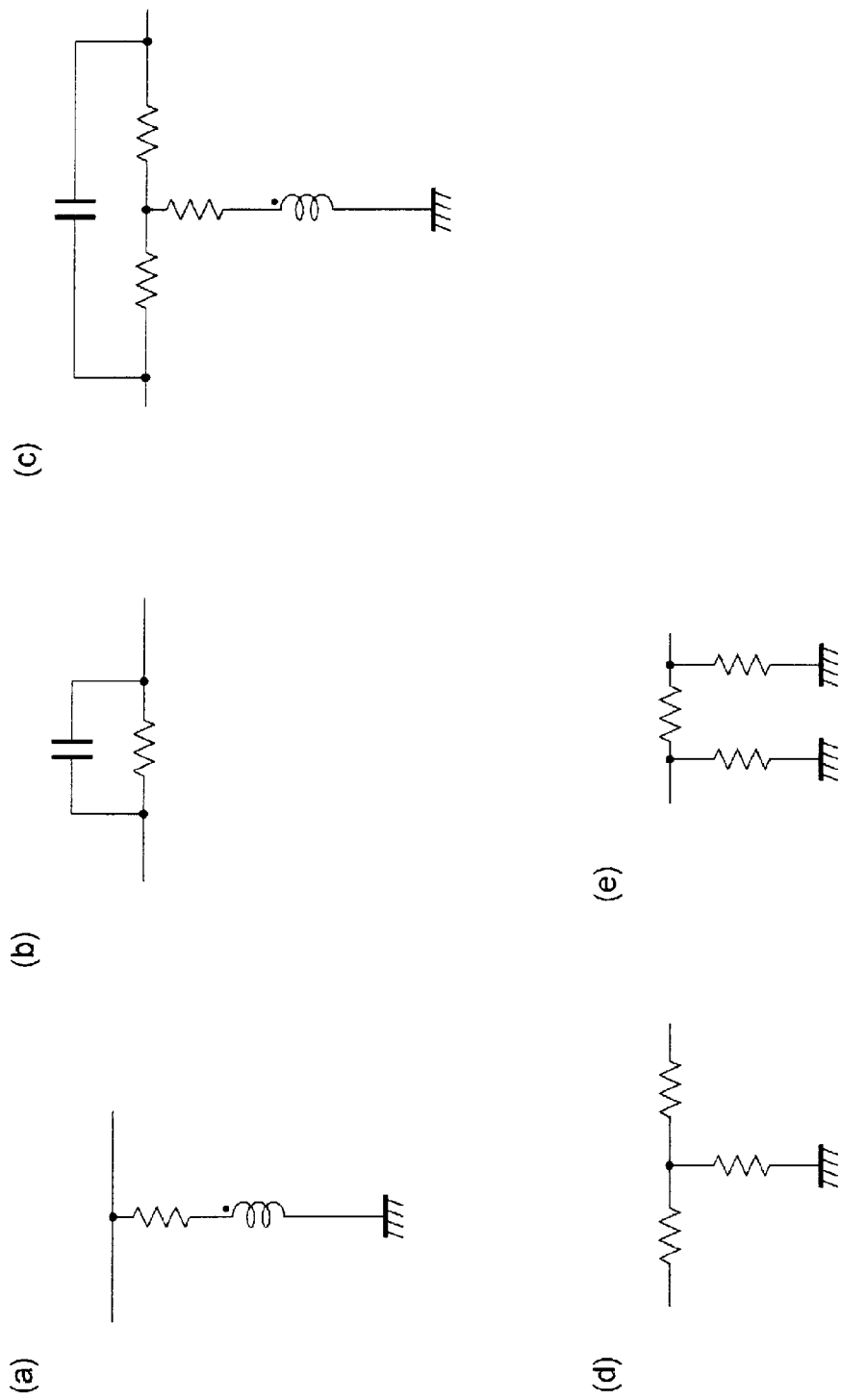
FIG. 8 is a view illustrating a circuit configuration of a loss adjusting part in the third modification example, and in FIG. 8, (a) illustrates a circuit that is constituted by a inductor and a resistor, (b) illustrates a circuit that is constituted by a resistor and a capacitor, (c) illustrates a circuit that is constituted by a inductor, a resistor, and a capacitor, and (d) and (e) illustrate a circuit that is constituted by a resistor.

The loss adjusting part 200C is a loss adjusting part that has frequency characteristics, and an electrical loss is reduced as a frequency becomes higher. Specifically, the loss adjusting part 200C may be constructed as a circuit that is constituted by a inductor and a resistor as illustrated in (a) of FIG. 8, a circuit that is constituted by a resistor and a capacitor as illustrated in (b) of FIG. 8, a circuit that is constituted by a inductor, a resistor, and a capacitor as illustrated in (c) of FIG. 8, or a combination of these circuits.

The loss adjusting part 100C is a loss adjusting part with fixed attenuation which is independent of frequency. Specifically, the loss adjusting part 100C can be constituted by plural resistors as illustrated in (d) and (e) of FIG. 8.

Figure 9:
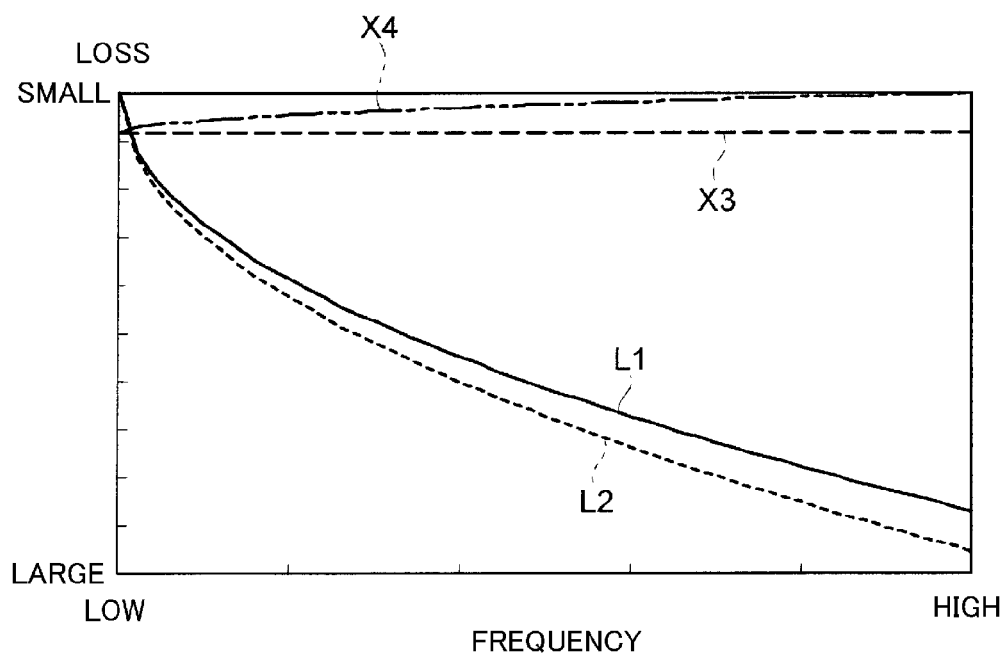
FIG. 9 is a view illustrating electrical loss characteristics of an electrical line 1, an electrical line 2, and a loss adjusting part in the third modification example.

FIG. 9 illustrates total electrical loss characteristics L1 in the combination (electrical line 1) of the first EO substrate line 431A and the first relay substrate line 31, total electrical loss characteristics L2 in the combination (electrical line 2) of the second EO substrate line 432A and the second relay substrate line 32, electrical loss characteristics X3 of the loss adjusting part 100C, and electrical loss characteristics X4 of the loss adjusting part 200C. In this modification example, a circuit configuration of the loss adjusting part 100C and a circuit configuration of the loss adjusting part 200C are selected so that the total electrical loss of the electrical loss (characteristics L1) in the electrical line 1 and the electrical loss (characteristics X3) in the loss adjusting part 100C becomes the same as the total electrical loss of the electrical loss (characteristics L2) in the electrical line 2 and the electrical loss (characteristics X4) in the loss adjusting part 200C.

As described above, the loss adjusting part 100C that increases the electrical loss of the first relay substrate line 31, and the loss adjusting part 200C that increases the electrical loss of the second relay substrate line 32 are provided, and thus it is possible to keep approximately the same electrical loss between the electrical line 1 and the electrical line 2 in an appropriate manner. Accordingly, it is possible to realize an optical modulation device having more flattened frequency characteristics while suppressing a difference in characteristics between the electrical line 1 and the electrical line 2.

Fourth Modification Example

Next, a fourth modification example of the loss adjusting part will be described. In the fourth modification example, as illustrated in FIG. 7, a loss adjusting part 100D is provided to the first relay substrate line 31 of an optical modulation device 1B, and a loss adjusting part 200D is provided to the second relay substrate line 32 of the optical modulation device 1B. All of the loss adjusting parts 100D and 200D are configured to increase an electrical loss.

The loss adjusting parts 100D and 200D are loss adjusting parts having frequency characteristics, and an electrical loss is reduced as a frequency becomes higher. In addition, a variation in the electrical loss with respect to a variation in the frequency is different between the loss adjusting part 100D and the loss adjusting part 200D. Specifically, the loss adjusting parts 100D and 200D may be constructed as a circuit that is constituted by a inductor and a resistor as illustrated in (a) of FIG. 8, a circuit that is constituted by a resistor and a capacitor as illustrated in (b) of FIG. 8, a circuit that is constituted by a inductor, a resistor, and a capacitor as illustrated in (c) of FIG. 8, or a combination of these circuits.

Figure 10:
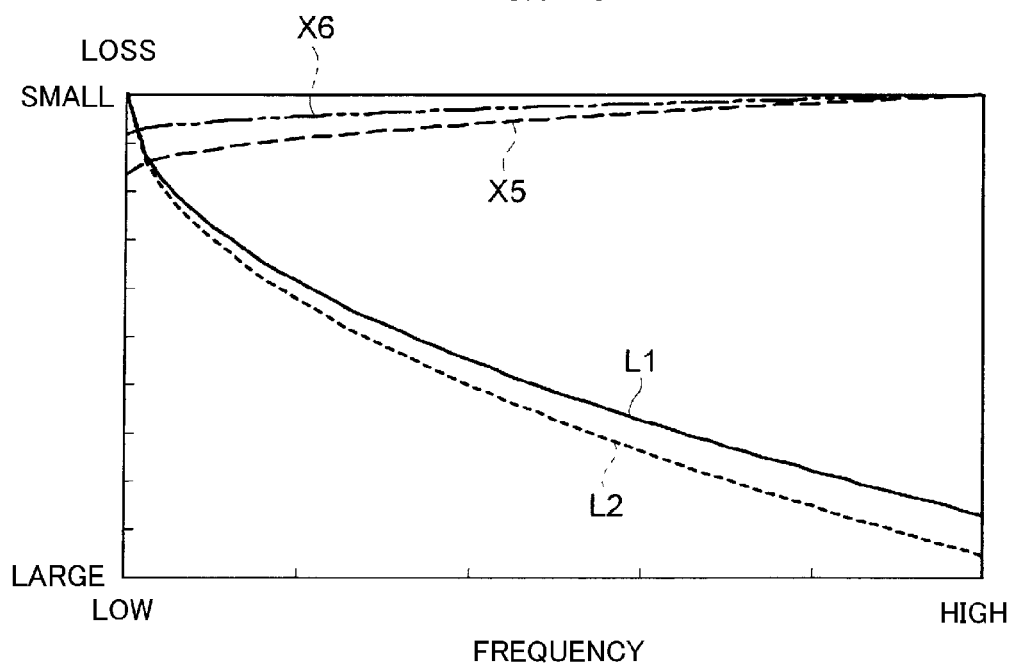
FIG. 10 is a view illustrating electrical loss characteristics of an electrical line 1, an electrical line 2, and a loss adjusting part in the fourth modification example.

FIG. 10 illustrates total electrical loss characteristics L1 in the combination (electrical line 1) of the first EO substrate line 431A and the first relay substrate line 31, total electrical loss characteristics L2 in the combination (electrical line 2) of the second EO substrate line 432A and the second relay substrate line 32, electrical loss characteristics X5 of the loss adjusting part 100D, and electrical loss characteristics X6 of the loss adjusting part 200D. In this modification example, a circuit configuration of the loss adjusting part 100D and a circuit configuration of the loss adjusting part 200D are selected so that the total electrical loss of the electrical loss (characteristics L1) in the electrical line 1 and the electrical loss (characteristics X5) in the loss adjusting part 100D becomes the same as the total electrical loss of the electrical loss (characteristics L2) in the electrical line 2 and the electrical loss (characteristics X6) in the loss adjusting part 200D.

As described above, the loss adjusting part 100D that increases the electrical loss of the first relay substrate line 31, and the loss adjusting part 200D that increases the electrical loss of the second relay substrate line 32 are provided, and thus it is possible to keep approximately the same electrical loss between the electrical line 1 and the electrical line 2 in an appropriate manner. Accordingly, it is possible to realize an optical modulation device having more flattened frequency characteristics while suppressing a difference in characteristics between the electrical line 1 and the electrical line 2.

Fifth Modification Example

In the embodiment described with reference to FIG. 1, the loss adjusting part 100, which increases the electrical loss, is used. However, in a case where the total electrical loss of the combination (electrical line 1) of the first EO substrate line 431A and the first relay substrate line 31 is greater than the total electrical loss of the combination (electrical line 2) of the second EO substrate line 432A and the second relay substrate line 32, as illustrated in FIG. 11, a loss adjusting part 101 configured to reduce the electrical loss of the first relay substrate line 31 may be provided.

Figure 11:
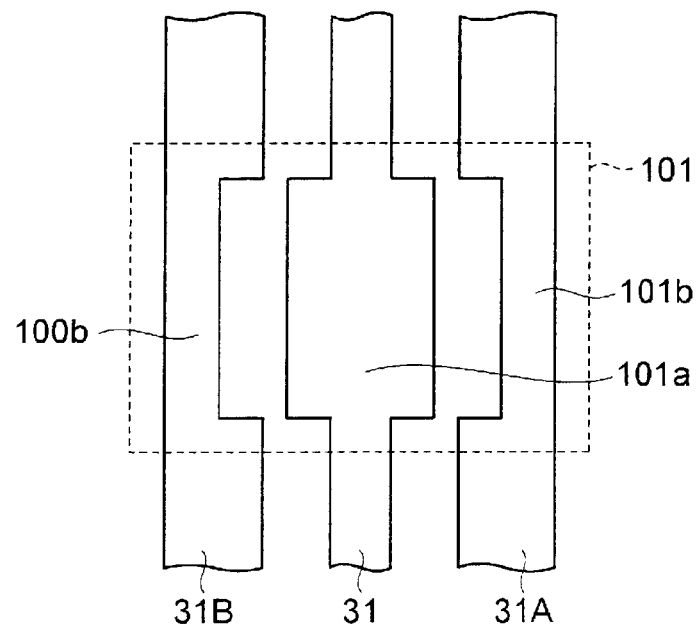
FIG. 11 is a view illustrating a schematic configuration of a loss adjusting part in a fifth modification example.

Specifically, as illustrated in FIG. 11, the loss adjusting part 101 can be constituted by a wide width part 101a in which the width of a part of the electrical line of the first relay substrate line 31 is broadened, and a draw-in part 101b in which the width of portions of the first ground electrode parts 31A and 31B which are adjacent to the wide width part 101a is narrowed.

When the wide width part 101a is provided, the electrical loss of the first relay substrate line 31 decreases. In addition, the shape of the wide width part 101a and the draw-in part 101b is set so that the total electrical loss in the combination of the first EO substrate line 431A and the first relay substrate line 31 becomes the same as the total electrical loss in the combination of the second EO substrate line 432A and the second relay substrate line 32. Even in this case, it is possible to realize down-sizing of the optical waveguide element 4 while keeping the same electrical loss between the lines which supply an electrical signal to the first interactive part 431 and the second interactive part 432, respectively.

Sixth Modification Example

Figure 12:
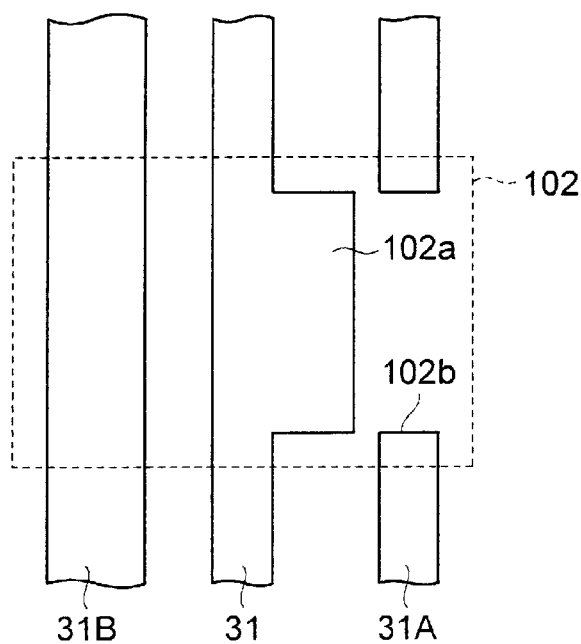
FIG. 12 is a view illustrating a schematic configuration of a loss adjusting part in a sixth modification example.

Next, a sixth modification example will be described. The sixth modification example has a configuration in which the configuration of the loss adjusting part 100E in the fifth modification example is changed. Specifically, as illustrated in FIG. 12, a wide width part 102a, in which a width of a part of the electrical line of the first relay substrate line 31 is broadened is provided as a loss adjusting part 102. In addition, a gap part 102b is provided by removing a portion adjacent to the wide width part 101a in the first ground electrode part 31A.

When the wide width part 102a is provided, the electrical loss of the first relay substrate line 31 decreases. In addition, when the gap part 102b is provided, a space into which electric lines of force spread becomes larger (gap interval is broadened). Accordingly, in the loss adjusting part 102, it is possible to reduce the electrical loss of the first relay substrate line 31. The shape and the like of the wide width part 102a and the gap part 102b of the loss adjusting part 102 are set so that the total electrical loss in the combination of the first EO substrate line 431A and the first relay substrate line 31 becomes the same as the total electrical loss in the combination of the second EO substrate line 432A and the second relay substrate line 32. Even in this case, it is possible to realize down-sizing of the optical waveguide element 4 while keeping the same electrical loss between the lines which supply an electrical signal to the first interactive part 431 and the second interactive part 432, respectively.

Hereinbefore, the embodiment and the various modification examples of the invention have been described, but the invention is not limited to the embodiment and the modification examples. For example, as the optical waveguide element 4, a modulator using a so-called Z-cut substrate can be used. In addition, as the optical waveguide element 4, an optical waveguide element having the Mach-Zehnder type optical waveguide structure is used, but optical waveguides having other structures may be used.

In the embodiment and the various modification examples, the electrical losses of the two lines supplied to the first interactive part 431 and the second interactive part 432 are made to be approximately the same as each other. However, in a case where three or more signal electrode parts and three or more signal electrode parts configured to supply the electrical signal to respective signal electrode parts are provided, the electrical loss of at least two or more lines can be made to be approximately the same in each case by using the above-described loss adjusting part 100 and the like. Even in this case, it is possible to obtain the same effect as in the case described above.

In the embodiment, and the fifth and sixth modification examples, the electrical loss is changed by changing the size of the signal electrode of the first relay substrate line 31, but the electrical loss may be changed by changing the gap between the signal electrode and the ground electrode, and the type of the electrode part. In this case, for example, a coplanar, a micro-strip, or a coplanar strip may be used.

INDUSTRIAL APPLICABILITY

According to the aspect of the invention, it is easy to select an electrode structure, which is advantageous for the down-sizing of lines, in an electrode (electrode line) other than the loss adjusting part, and this has an effect on the down-sizing of a device.

REFERENCE SIGNS LIST 1, 1A, 1B: Optical modulation device
3: Relay substrate unit
3A: First relay substrate unit
3B: Second relay substrate unit
4: Optical waveguide element
31: First relay substrate line
32: Second relay substrate line
421a, 421b: Optical waveguide (first optical waveguide)
422a, 422b: Optical waveguide (second optical waveguide)
431: First interactive part
432: Second interactive part
100, 100A, 100B, 100C, 100D, 200C, and 200D: Loss adjusting part

The invention claimed is:
1. An optical modulation device, comprising:
an optical waveguide element that is provided to a substrate having an electro-optical effect; and
a relay substrate unit that inputs an electrical signal to the optical waveguide element,
wherein an optical waveguide of the optical waveguide element is a nested optical waveguide having a first and a second optical waveguides which are Mach-Zehnder parts,
wherein the optical waveguide element includes,
the first optical waveguide to which a light-wave is input,
a first interactive part which is provided along the first optical waveguide, and interacts with the light-wave that is guided through the first optical waveguide,
a first EO substrate line that inputs the electrical signal to the first interactive part,
the second optical waveguide to which the light-wave is input,
a second interactive part which is provided along the second optical waveguide, and interacts with the light-wave that is guided through the second optical waveguide, and
a second EO substrate line that inputs the electrical signal to the second interactive part,
the relay substrate unit includes,
a first relay substrate line which is connected to the first EO substrate line, and transmits the electrical signal to the first EO substrate line,
a second relay substrate line which is connected to the second EO substrate line, and transmits the electrical signal to the second EO substrate line, and
a loss adjusting part that adjusts an electrical loss,
wherein the first relay substrate line and the second relay substrate line are formed as coplanar type lines wherein each coplanar type line comprises one signal electrode positioned between two ground electrodes,
and wherein an electrical length of the first EO substrate line and an electrical length of the second EO substrate line are different from each other,
a total electrical length in a combination of the first EO substrate line and the first relay substrate line, and a total electrical length in a combination of the second EO substrate line and the second relay substrate line are approximately the same as each other, and
the loss adjusting part is formed as a coplanar strip type line comprising one signal electrode and only one ground electrode that is positioned on only one side of the signal electrode, and is provided to at least a part of the first relay substrate line or a part of the second relay substrate, and a width of the signal electrode of the coplanar strip type line in the loss adjusting part is different from a width of the signal electrode of the coplanar type line in front of the coplanar strip type line and behind the coplanar strip type line so that a total electrical loss in the combination of the first EO substrate line and the first relay substrate line, and a total electrical loss in the combination of the second EO substrate line and the second relay substrate line become approximately the same as each other.
2. The optical modulation device according to claim 1, wherein the loss adjusting part is constituted by an electrical line of which a loss is different from a loss of the first EO substrate line, the second EO substrate line, the first relay substrate line, and the second relay substrate line.

* * * * *